No. 792,354. PATENTED JUNE 13, 1905.
E. W. SHARBAUGH.
HAT STRETCHER.
APPLICATION FILED OCT. 14, 1904.

Witnesses
Inventor
E. W. Sharbaugh
By Robert Watson
Attorney

No. 792,354.

Patented June 13, 1905.

UNITED STATES PATENT OFFICE.

EDWARD W. SHARBAUGH, OF EAST PITTSBURG, PENNSYLVANIA.

HAT-STRETCHER.

SPECIFICATION forming part of Letters Patent No. 792,354, dated June 13, 1905.

Application filed October 14, 1904. Serial No. 228,429.

*To all whom it may concern:*

Be it known that I, EDWARD W. SHARBAUGH, a citizen of the United States, residing at East Pittsburg, in the county of Allegheny and State of Pennsylvania, have invented certain new and useful Improvements in Hat-Stretchers, of which the following in a specification.

The purpose of my invention is to provide a hat-stretcher having improved means for expanding and contracting the segments of which the block is composed.

The construction and operation of my hat-stretcher will be clear from the following description when taken in connection with the accompanying drawings, in which—

Figure 1:
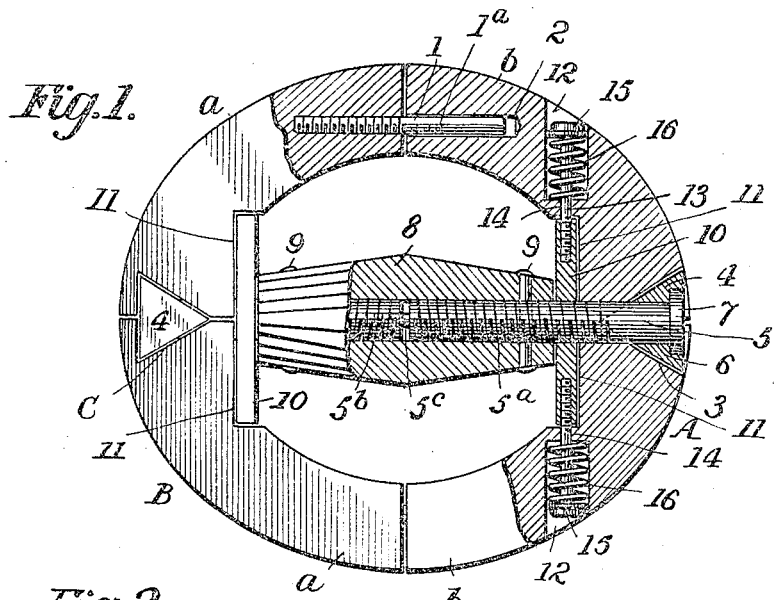
Figure 2:
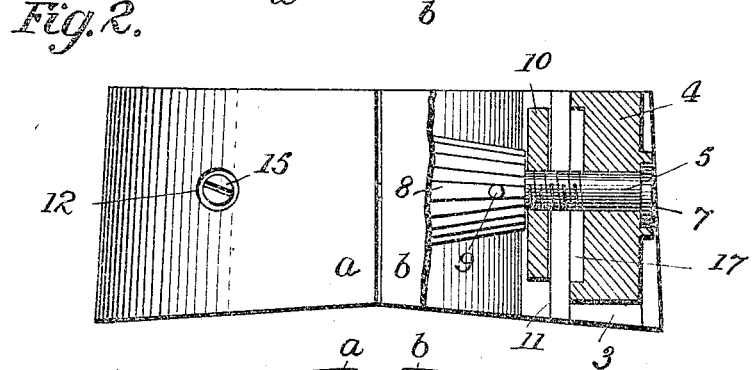
Figure 3:
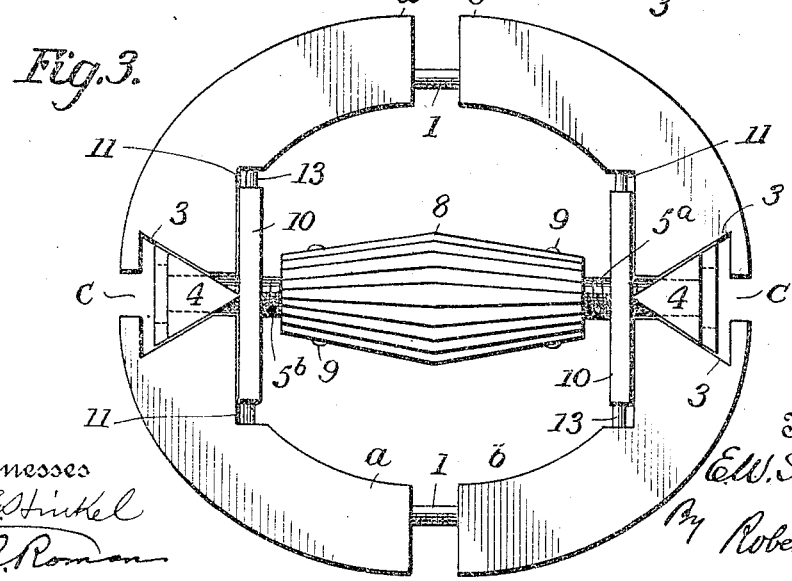

Figure 1 is a top plan view of the stretcher, partly in horizontal section, the segments being shown in their closed position. Fig. 2 is a side view of the stretcher inverted and partly in vertical section, and Fig. 3 is a top plan view of the stretcher with the segments expanded.

Referring to the drawings, A and B indicate two semi-elliptical half-blocks of similar construction and each composed of two segmental blocks $a$ and $b$, the segmental blocks each being similar in construction. The segments of each half-block are connected in sliding engagement with one another by means of a guide rod or pin 1, threaded into the block $a$ and extending into a longitudinal recess or socket 2 in the block $b$. The half-blocks when brought together form an ellipse, as shown in Fig. 1, and the meeting ends of the half-blocks are provided with faces 3, which incline from the periphery of the stretcher inwardly toward one another, forming V-shaped slots C between the meeting ends of the half-blocks. Within the V-shaped slots are arranged wedge-pieces 4, which are connected together by a rod 5, which extends through and may turn freely within openings 6 in the wedges. This rod is provided with heads 7 at its ends, which form stops for the wedge-pieces. The rod 5 is conveniently composed of right and left threaded screws $5^a$ and $5^b$, connected together at the center by a connecting-piece $5^c$. A handle or grip 8 surrounds the threaded rod within the interior of the stretcher, and this grip is secured to the rod by suitable means, such as the pins 9, so that when the grip is turned the threaded rod will be turned by it. Between the ends of the grip 8 and the inner ends of the half-blocks are arranged followers 10, consisting, as shown, of flat blocks threaded onto the rod and adapted to bear against the flat surfaces 11 at the ends of both half-blocks. The segments are provided with sockets 12, extending horizontally inward in line with the ends of the followers 10, and studs 13, threaded into the ends of the followers, project through openings 14 in the bases of the socket 12. These studs are provided with heads 15, and coiled springs 16 are interposed between said heads and the bottoms of the sockets. These springs tend to force the two half-blocks toward one another.

In operation when it is desired to expand the stretcher the grip 8 is turned in the proper direction to force the followers 10 outward upon the reversely-threaded screw or rod 5. As the followers move outward they will force the segments $a$ and $b$ of each half-block apart and will also force the inclined faces 3 at the ends of the half-blocks against the sides of the wedge-pieces 4, thus causing the half-blocks to spread laterally apart against the action of the springs 16. When it is desired to contract the stretcher, the grip 8 is turned in the reverse direction, thus drawing the followers inward toward one another. As the followers 10 move inward it will be seen that the inclined faces of the half-blocks which are pressed against the wedge-pieces by the springs will slide toward the apices of the wedges and the various segments of the stretcher will be moved radially inward by the combined action of the springs and wedge-pieces.

In order to permit the stretcher to be expanded to a considerable extent, the inner ends of the wedge-pieces may be recessed, as indicated by the numeral 17, so as not to interfere with the followers when the stretcher is fully expanded. In such case the followers will enter the recesses 17.

The guide-pins 1 may be each marked with a scale $1^a$ to indicate the degree of expansion of the stretcher.

Having described my invention, what I claim, and desire to secure by Letters Patent, is—

1. In a hat-stretcher, two half-blocks, each composed of segments having a sliding connection with one another, spring-pressed means for moving said half-blocks toward one another, and means for expanding the stretcher comprising a pair of wedge-pieces arranged between the ends of the half-blocks and suitably held against outward movement, and means for forcing the half-blocks outward against said wedges.

2. In a hat-stretcher, two half-blocks, each composed of segments having a sliding connection with one another, spring-pressed means for moving said half-blocks toward one another, and means for expanding the stretcher comprising a pair of wedge-pieces arranged between the ends of the half-blocks and suitably held against outward movement, a right and left threaded screw extending between the half-blocks, and followers threaded onto said screw and arranged to force the half-blocks outward against said wedges.

3. In a hat-stretcher, two half-blocks, each composed of segments having a sliding connection with one another, spring-pressed means for moving said half-blocks toward one another, and means for expanding the stretcher comprising a right and left threaded screw extending between the half-blocks and having stops at its ends, wedge-pieces loosely mounted upon said screw between the ends of the half-blocks and held against outward movement by said stops, and followers threaded upon said screw and adapted to force the half-blocks outward against said wedges.

4. In a hat-stretcher, two half-blocks, each composed of segments having a sliding connection with one another, the meeting ends of said half-blocks having inclined faces, forming V-shaped slots with their apices toward the interior of the block, wedge-pieces within said slots, a right and left threaded screw extending between the half-blocks, and adapted to turn loosely within openings in the wedges, said screw having heads or stops at its ends to prevent the outward movement of the wedges, followers upon said screw arranged to force the ends of the half-blocks outward against the wedges, and spring-pressed means for moving said half-blocks toward one another.

5. In a hat-stretcher, two half-blocks, each composed of segments having a sliding connection with one another, a right and left threaded screw extending between the half-blocks, inwardly-pointing wedges held against outward movement upon the ends of the screw between the half-blocks, a pair of followers threaded upon the screw and adapted to force the ends of the half-blocks outwardly against the wedges, and spring connections between said followers and the half-block.

6. In a hat-stretcher, two half-blocks, each comprising two segments having a sliding connection with one another, said sections having sockets extending inwardly from their outer sides, a right and left threaded screw arranged between the half-blocks, wedge-pieces loosely mounted on the ends of said screw between the ends of the half-blocks, a pair of followers threaded onto said screw and adapted to force the ends of the half-blocks against the wedges, studs secured to said followers and extending into said sockets and springs interposed between the outer ends of said studs and the bottoms of the sockets.

In testimony whereof I affix my signature in presence of two witnesses.

EDWARD W. SHARBAUGH.

Witnesses:
JOHN W. FARNSWORTH,
WILLIAM A. GALLAGHER.